Patented Aug. 30, 1949

2,480,473

UNITED STATES PATENT OFFICE 2,480,473

REFRACTORY AND METHOD OF MAKING

Arthur F. Johnson, Cambridge, Mass., assignor to Reynolds Metals Company, Richmond, Va., a corporation of Delaware No Drawing. Application December 10, 1945, Serial No. 634,145

7 Claims. (Cl. 106—63)

This invention relates to refractories and has for its object the provision of an improved refractory and a method of producing the refractory. The invention is especially concerned with refractories for use in lining furnaces, pots, ladles, cells and other vessels for salt fusions or similar molten masses, and provides an improved refractory comprising aluminum nitride together with binding material. The invention provides vessels for the treatment or production of aluminum, the interior surface of which is a refractory formed largely of aluminum nitride.

While the refractories of the invention have several uses as in the glass making industry, they are especially advantageous in the aluminum industry for lining vessels for aluminiferous fusions, such as aluminum reduction cells, ladles, crucibles, metal refining cells and the like. The aluminum nitride refractory of the invention is very tough, has a high melting point and is neither attacked nor penetrated to any appreciable extent by cryolite fusions. The refractory forms an especially important combination with electrically non-conducting refractory, such as fused alumina or magnesia, which are soluble in cryolite. In one of its embodiments the invention provides a refractory composition formed by heating in contact with nitrogen a pulverulent mixture comprising, as the major component, aluminum, a fluoride material such as cryolite, and carbon such as charcoal. A refractory composition of the invention as usually produced from such mixtures comprises a mixture of particles of aluminum nitride, aluminum oxide, a halide such as cryolite or calcium fluoride, and residual carbon. The aluminum oxide and halide mixture acts as a binder and gives the refractory strength and rigidity. The aluminum nitride makes the aluminum oxide resistant to solution in fused halide baths.

The invention also provides a composite refractory comprising a refractory material with a lining comprising aluminum nitride bonded thereto, for example, a composite refractory comprising fused alumina, fused magnesia or fused alumina-magnesia spinel with a lining or veneer comprising an aluminum nitride refractory. The lining may be bonded by fusion to the refractory or physically attached thereto as by interlocking connections. Where the refractory is formed as a bonded lining or veneer, it is preferable to form it over a very dense brick such as electro-cast alumina which is as vitreous as possible.

In one of its aspects, the invention provides a method of producing an aluminum nitride refractory involving the heating of pulverulent aluminum, such as atomized aluminum, to a temperature around 1000° C. in nitrogen, such as in the atmosphere while protecting the aluminum from undue oxidation. I have found that an aluminum nitride refractory may be formed by heating very fine aluminum powder, minus 100 mesh, with powdered charcoal, to a temperature below the agglomerating temperature of the aluminum, say, around 1000° C., in the atmosphere and that I may convert most, if not all, of the aluminum to its nitride. A certain amount of oxygen or carbon dioxide is available and a part of the aluminum is oxidized to aluminum oxide. In such operations an undue amount of aluminum oxide is prevented from forming by the protection afforded by the carbon or the carbon monoxide formed by oxidation of the charcoal. The cryolite or like compound seems to dissolve or in some way associate with the aluminum oxide to form a tough and strong binder for the aluminum nitride and the residual carbon.

I may dispense with the use of fine carbon and heat the aluminum and calcium fluoride or cryolite in the atmosphere while protecting the aluminum from oxidation with carbon monoxide.

I have found it advantageous to use from 10% to 20% of charcoal and a halide, for example, from 10% to 20% of calcium fluoride or, say, 10% to 20% of cryolite in the composition. When the aluminum nitride refractory composition is for use in the reduction of bauxite solutions in cryolite, as in the Hall process, it is more effective to use as a halide calcium fluoride because of its higher melting point.

In still another aspect of my invention, I may subject a pulverulent mixture of aluminum, a small amount of alumina, and carbon to a temperature around 1000° C. in an atmosphere of nitrogen and form a mixture of aluminum nitride, aluminum carbide, alumina and carbon. This mixture may be ground with cryolite and fused.

I may form a refractory composition of the invention by mixing and fusing together aluminum nitride and binder such as cryolite or calcium fluoride, with or without alumina or carbon. I may also mix and fuse together aluminum nitride, aluminum carbide, cryolite or calcium fluoride and a little carbon if desired. In either of these mixtures in which the aluminum nitride is formed before mixing, I may use from around 60% to 85% of the nitride to form very effective compositions.

One of the advantageous aspects of the invention is that I may form the refractory in the vessel where it is to remain for use. For example, in lining an electrolytic reduction cell, such as one with electrically non-conducting fused alumina or magnesia, I may apply a lining of the aluminum, carbon and halide mixture to the alumina or magnesia and fill the space with coke which is heated as an electrical resistor by passing an electric current therethrough between a pair of electrodes. In, say 10 to 20 hours, a dense, tough and inert refractory lining is formed that is chemically inert to aluminiferous fusions.

In carrying out a method of the invention, I may use aluminum in any suitable state of fineness, say, from 40 to 200 mesh, a very effective size being through 100 mesh. The carbon in the form of charcoal or petroleum coke and the halide, say, calcium fluoride, may be of about the same fineness. The ingredients are mixed together dry and then rammed in place, as a lining between bricks and a core or into molds. In one example, the following materials were used in forming the composition:

| | Per cent |
|---|---|
| Atomized aluminum powder (—200 mesh) | 83 |
| Cryolite | 12 |
| Petroleum coke (—200 mesh) | 5 |

A dry mixture of the material was rammed between fused dense vitreous alumina bricks of a cell and a plywood form. The space inside the plywood form was filled with pea-sized coke and heated electrically as a resistor to a temperature of around 1100° C. In five hours the baking was complete and the coke was removed. Since the material undergoes an appreciable expansion which is not easily determined, it is advisable to make the lining thicker than required and chisel it down to the desired thickness while red hot. Moreover, the exterior is apt to be high in alumina, when the lining is formed as above described, which should be removed. The above lining comprised about 70% aluminum nitride, residual aluminum, cryolite and some carbon, and was impervious to the cryolite bath. One characteristic of the lining is that vessels lined with it may be used for cryolite fusions before the nitriding is complete. The soaking in cryolite makes the lining hard and tough and the nitriding continues during use.

In another example the following composition was used:

| | Per cent |
|---|---|
| Alumina powder 99% pure (—100 mesh) | 86 |
| Fluorspar | 6 |
| Cryolite | 4 |
| Charcoal (—60 mesh) | 4 |

A formed body of a mixture of the above composition was heated slowly for 16 hours to 1000° C. in contact with the atmosphere. It contained 58.2% aluminum nitride residual aluminum, fluorspar, cryolite, and some charcoal.

I claim:

1. A refractory comprising a fused admixture containing from about 60% to 85% of aluminum nitride, from about 10% to 20% of a binder selected from the group consisting of calcium fluoride and cryolite, with the remainder consisting of carbon and aluminiferous material selected from the group consisting of aluminum oxide, aluminum carbide and aluminum.

2. A refractory as set forth in claim 1 in which the binder is calcium fluoride.

3. A refractory as set forth in claim 1 in which the binder is cryolite.

4. A refractory as set forth in claim 1 in which the carbon does not exceed 5%.

5. The method of producing a fused refractory containing aluminum nitride which comprises forming a mixture consisting of pulverulent aluminum, from about 10% to 20% of carbon and from about 10% to 20% of a binder material selected from the group consisting of calcium fluoride and cryolite, heating the admixture at an elevated temperature around 1000° C. in an atmosphere containing nitrogen to convert the aluminum largely to aluminum nitride, and continuing such heating until the admixture contains about 60% to 85% aluminum nitride.

6. The method of producing a fused refractory as set forth in claim 5 in which the binder material is calcium fluoride.

7. The method of producing a fused refractory as set forth in claim 5 in which the binder material is cryolite.

ARTHUR F. JOHNSON.

REFERENCES CITED

The following references are of record in the file of this patent:

FOREIGN PATENTS

| Number | Country | Date |
|---|---|---|
| 1,961 | Great Britain | 1912 |
| 242,455 | Germany | 1912 |
| 438,998 | France | 1912 |